United States Patent
Yu et al.

(10) Patent No.: US 12,482,091 B2
(45) Date of Patent: Nov. 25, 2025

(54) DETECTING DEFECTS ON SPECIMENS

(71) Applicant: KLA Corporation, Milpitas, CA (US)

(72) Inventors: Li Yu, Shanghai (CN); Wei Si, Shanghai (CN); Prashant Verma, Fremont, CA (US); Xiaochun Li, San Jose, CA (US); Sangbong Park, Danville, CA (US)

(73) Assignee: KLA CORPORATION, Milpitas, CA (US)

( * ) Notice: Subject to any disclaimer, the term of this patent is extended or adjusted under 35 U.S.C. 154(b) by 504 days.

(21) Appl. No.: 17/978,713

(22) Filed: Nov. 1, 2022

(65) Prior Publication Data

US 2024/0054632 A1 Feb. 15, 2024

Related U.S. Application Data

(60) Provisional application No. 63/396,611, filed on Aug. 10, 2022.

(51) Int. Cl.
  *G06T 7/00* (2017.01)
  *G06T 7/73* (2017.01)
  *H01L 21/67* (2006.01)

(52) U.S. Cl.
  CPC .............. *G06T 7/001* (2013.01); *G06T 7/74* (2017.01); *G06T 2207/10024* (2013.01);
  (Continued)

(58) Field of Classification Search
  CPC .. G06T 7/00; G06T 7/001; G06T 7/73; G06T 7/74; G06T 2207/10024;
  (Continued)

(56) References Cited

U.S. PATENT DOCUMENTS 8,126,255 B2 * 2/2012 Bhaskar .................. G06T 7/001
  382/141
8,274,688 B2 * 9/2012 Rai ......................... G06Q 10/06
  358/1.15

(Continued)

FOREIGN PATENT DOCUMENTS

JP  2005-195504  7/2005
JP  2005195504 A * 7/2005
(Continued)

OTHER PUBLICATIONS

International Search Report and Written Opinion for PCT/US2023/026272 mailed Oct. 18, 2023.

*Primary Examiner* — Stephen R Koziol
*Assistant Examiner* — Benedict E Lee
(74) *Attorney, Agent, or Firm* — Entropy Matters LLC

(57) ABSTRACT

Methods and systems for detecting defects on a specimen are provided. One system performs double detection in which at least one of the reference images compared to a test image is a computed reference image generated from multiple images corresponding to the test image. The other reference image may or may not be computed from more than one of the multiple images. Such a computed reference image may also be a median-based computed reference generated from multiple-median images generated from different subsets of images in a job of images generated by an inspection subsystem for a specimen. Such a system may also group images for a die row on a specimen into different jobs based on color so that different jobs have different color value ranges. Such grouping may also be performed so that each of the jobs includes a number of images greater than a predetermined, minimum job size.

23 Claims, 5 Drawing Sheets

(52) U.S. Cl.
CPC ............... *G06T 2207/30148* (2013.01); *G06T 2207/30168* (2013.01); *H01L 21/67288* (2013.01)

(58) Field of Classification Search
CPC . G06T 2207/30148; G06T 2207/30168; H01L 21/67; H01L 21/67288
See application file for complete search history.

(56) References Cited

U.S. PATENT DOCUMENTS

| | | | | |
|---|---|---|---|---|
| 8,664,594 | B1* | 3/2014 | Jiang | H01J 37/28 250/311 |
| 8,692,204 | B2* | 4/2014 | Kojima | H01J 37/244 250/362 |
| 8,698,093 | B1* | 4/2014 | Gubbens | H01J 37/145 250/396 ML |
| 8,716,662 | B1* | 5/2014 | MacDonald | H01J 37/28 250/311 |
| 9,222,895 | B2* | 12/2015 | Duffy | G01N 21/9501 |
| 9,747,670 | B2* | 8/2017 | Pettibone | G06T 5/50 |
| 10,127,652 | B2* | 11/2018 | Gao | G06T 7/001 |
| 10,151,706 | B1* | 12/2018 | Bhattacharyya | H01L 22/20 |
| 10,395,359 | B2* | 8/2019 | Huang | G06T 7/90 |
| 10,402,688 | B2* | 9/2019 | Brauer | G06F 18/28 |
| 11,004,193 | B2* | 5/2021 | Hirano | G06T 7/001 |
| 11,270,430 | B2* | 3/2022 | Sezginer | G06T 7/001 |
| 2015/0221076 | A1 | 8/2015 | Gao et al. | |
| 2017/0287128 | A1 | 10/2017 | Huang et al. | |
| 2019/0213726 | A1 | 7/2019 | Hirano et al. | |
| 2023/0013887 | A1* | 1/2023 | Ito | G06T 5/60 |

FOREIGN PATENT DOCUMENTS

| | | | | |
|---|---|---|---|---|
| JP | 2016-111166 | | 6/2016 | |
| JP | 2016111166 | A * | 6/2016 | |
| JP | 2022-103425 | | 7/2022 | |
| JP | 2022103425 | A * | 7/2022 | G06T 7/001 |

* cited by examiner

DETECTING DEFECTS ON SPECIMENS

BACKGROUND OF THE INVENTION

1. Field of the Invention

The present invention generally relates to methods and systems for detecting defects on a specimen in the semiconductor arts.

2. Description of the Related Art

The following description and examples are not admitted to be prior art by virtue of their inclusion in this section.

Fabricating semiconductor devices such as logic and memory devices typically includes processing a specimen such as a semiconductor wafer using a number of semiconductor fabrication processes to form various features and multiple levels of the semiconductor devices. For example, lithography is a semiconductor fabrication process that typically involves transferring a pattern to a resist arranged on a semiconductor wafer. Additional examples of semiconductor fabrication processes include, but are not limited to, chemical-mechanical polishing, etch, deposition, and ion implantation. Multiple semiconductor devices may be fabricated in an arrangement on a semiconductor wafer and then separated into individual semiconductor devices.

Inspection using either optical or electron beam imaging is an important technique for debugging semiconductor manufacturing processes, monitoring process variations, and improving production yield in the semiconductor industry. With the ever decreasing scale of modern integrated circuits (ICs) as well as the increasing complexity of the manufacturing process, inspection becomes more and more difficult.

In each processing step performed on a semiconductor wafer, the same circuit pattern is printed in each die. Most wafer inspection systems take advantage of this fact and use a relatively simple die-to-die comparison to detect defects on the wafer. However, the printed circuit in each die may include many areas of patterned features that repeat in the x or y direction such as the areas of DRAM, SRAM, or FLASH. This type of area is commonly referred to as an "array area" (the rest of the areas are called "random" or "logic areas"). To achieve better sensitivity, advanced inspection systems employ different strategies for inspecting the array areas and the random or logic areas.

One of the problems with inspection in logic areas is that the pattern usually repeats over a relatively large pitch such as from die-to-die rather than within a die as with array regions. What that means for inspection is that for a test image, a suitable reference image may be from a neighboring die which can have significant differences from the test image. Those differences between the dies may not be due to defects but due to non-defect noise sources on the specimen (such as thickness and color variation) and/or differences in the processing of the dies that is not problematic for the devices themselves but can cause differences in the images generated for the dies (such as variation from one lithography exposure to another). Those differences may, however, be erroneously detected as defects, which can obviously cause a number of other problems for the usefulness of the inspection results.

Several different methods for acquiring or generating a suitable reference image for die-to-die type comparisons have, therefore, been developed. Some of the first attempts to generate a suitable reference image involved simulating the reference image from design data for the specimen. Such simulations often have their own problems though such as the difficulty in accounting for the actual patterns on the specimen and non-defect related variations in the images generated from die-to-die and/or specimen-to-specimen (when the same reference image is used for multiple specimens). Therefore, other attempts involve generating a reference image from actual images of the specimen.

One way to generate a reference image from actual specimen images includes computing a reference image from images of multiple instances of the same patterned area on the specimen (such as images of multiple dies on the specimen). Such references are often referred to as "computed references" or CRs. The theory behind combining multiple, actual specimen images to generate a CR is that any defect signals in any of the images that are combined will be mitigated by the combining process thereby generating a reference image that better represents a "defect-free" instance of the repeating patterned area.

One example of a currently used CR method processes 8 neighboring frames in one job, which are coming from the same die row. In CR, for each target test frame (Test), all other test frames in the job are selected as base frames to be combined into a single reference frame (Ref) with minimum difference between Test and Ref. Then, defects can be detected in the comparison: Test–Ref.

Currently used CR methods and systems for defect detection do have a number of important disadvantages. For example, currently used CR methods and systems require job frames to have substantially similar color (gray scale). If job frames have relatively large color variation, the generated Ref frame is hard to match with Test, which results in relatively low defect detection sensitivity and substantially high nuisance rate. In addition, defects on CR base frames can lead to artifacts in the currently used CR methods and systems.

Accordingly, it would be advantageous to develop systems and methods for inspection of specimens that do not have one or more of the disadvantages described above.

SUMMARY OF THE INVENTION

The following description of various embodiments is not to be construed in any way as limiting the subject matter of the appended claims.

One embodiment relates to a system configured for detecting defects on a specimen. The system includes an inspection subsystem configured for generating images for a specimen including a test image, two or more first images corresponding to the test image, and one or more second images corresponding to the test image. The system also includes a computer subsystem configured for computing first and second reference images for the test image from the two or more first images and the one or more second images, respectively. One or more characteristics of the first and second reference images are different. The computer subsystem is also configured for generating first and second difference images by separately comparing the test image to the first and second reference images, respectively. In addition, the computer subsystem is configured for detecting defects in the test image by applying a defect detection method to the first and second difference images. The defect detection method determines that a defect is present at a location in the test image only when the defect detection method detects the defect at corresponding locations in the first and second difference images. The system may be further configured as described herein.

Another embodiment relates to a computer-implemented method for detecting defects on a specimen. The method includes acquiring images for a specimen generated by an inspection subsystem including a test image, two or more first images corresponding to the test image, and one or more second images corresponding to the test image. The method also includes the computing, generating, and detecting steps described above. The acquiring, computing, generating, and detecting are performed by a computer subsystem coupled to the inspection subsystem. Each of the steps of the method described above may be performed as described further herein. In addition, the embodiment of the method described above may include any other step(s) of any other method(s) described herein. The method described above may be performed by any of the systems described herein.

Another embodiment relates to a non-transitory computer-readable medium storing program instructions executable on a computer system for performing a computer-implemented method for detecting defects on a specimen. The computer-implemented method includes the steps of the method described above. The computer-readable medium may be further configured as described herein. The steps of the computer-implemented method may be performed as described further herein. In addition, the computer-implemented method for which the program instructions are executable may include any other step(s) of any other method(s) described herein.

A further embodiment relates to another system configured for detecting defects on a specimen. This system includes an inspection subsystem configured for generating images for a specimen. The system also includes a computer subsystem configured for grouping the images generated by the inspection subsystem for a die row on the specimen into different jobs based on color so that the images in a first of the different jobs have a first color value range and the images in a second of the different jobs have a second color value range different than the first color value range. The computer subsystem is also configured for detecting defects in the images in the first of the different jobs by applying a defect detection method to only the images in the first of the different jobs. In addition, the computer subsystem is configured for detecting defects in the images in the second of the different jobs by applying the defect detection method to only the images in the second of the different jobs. The system may be further configured as described herein.

An additional embodiment relates to a different system configured for detecting defects on a specimen. This system includes an inspection subsystem configured for generating images for a specimen. This system also includes a computer subsystem configured for computing multi-median images from different subsets of images in a job of the images generated by the inspection subsystem for the specimen. The computer subsystem is also configured for computing a median-based computed reference from the multiple-median images. In addition, the computer subsystem is configured for generating a difference image by comparing a test image in the job to the median-based computed reference and detecting defects in the test image by applying a defect detection method to the difference image. The system may be further configured as described herein.

BRIEF DESCRIPTION OF THE DRAWINGS

Further advantages of the present invention will become apparent to those skilled in the art with the benefit of the following detailed description of the preferred embodiments and upon reference to the accompanying drawings in which.

Figure 1:
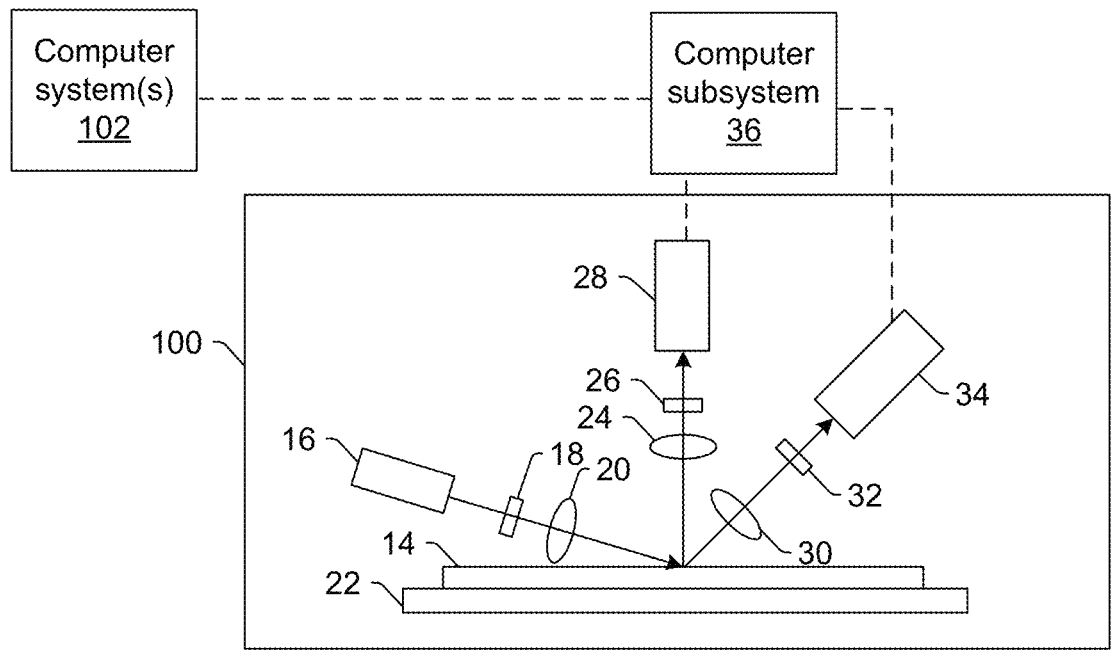
FIGS. 1 and 1a are schematic diagrams illustrating side views of embodiments of a system configured as described herein.

While the invention is susceptible to various modifications and alternative forms, specific embodiments thereof are shown by way of example in the drawings and are herein described in detail. The drawings may not be to scale. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

Turning now to the drawings, it is noted that the figures are not drawn to scale. In particular, the scale of some of the elements of the figures is greatly exaggerated to emphasize characteristics of the elements. It is also noted that the figures are not drawn to the same scale. Elements shown in more than one figure that may be similarly configured have been indicated using the same reference numerals. Unless otherwise noted herein, any of the elements described and shown may include any suitable commercially available elements.

In general, the embodiments described herein are configured for detecting defects on a specimen. The embodiments described herein are particularly useful for defect detection that uses a threshold (for separating defects from non-defects) that adapts to color such as the multi-color adaptive threshold (MCAT) algorithm that is used by some inspection tools commercially available from KLA Corp., Milpitas, Calif. However, the embodiments described herein provide a number of improvements to such MCAT algorithms and so may be referred to as MCAT2. Such improvements include a new computed reference (CR) generation method, CR performed with double detection, and grouping jobs by color.

CR is a powerful method for detecting random defects in wafer logic regions. Current CR requires all test frames in a job to have substantially similar color, which cannot be satisfied all the time in reality, resulting in relatively low sensitivity and substantially high nuisance rate. In addition, defects on CR base frames will introduce artifacts in the generated final reference image. The embodiments described herein have a number of new features that can be implemented individually or in a combination such as a new CR generation method plus double detection, which can: alleviate color variation by within-job similarity grouping and larger job size, further reduce nuisances and artifacts by double detection, and use median-based CR for at least one of the references used for double detection.

"Nuisances" (which is sometimes used interchangeably with "nuisance defects") as that term is used herein is generally defined as events that are detected on a specimen but are not really actual defects on the specimen. Nuisances that are not actually defects may be detected as events due to non-defect noise sources on a specimen (e.g., grain in metal lines on the specimen, signals from underlying layers or materials on the specimen, line edge roughness (LER), relatively small critical dimension (CD) variation in patterned features, thickness variations, etc.) and/or due to marginalities in the inspection system itself or its configuration used for inspection.

In some embodiments, the specimen is a wafer. The wafer may include any wafer known in the semiconductor arts. Although some embodiments may be described herein with respect to a wafer or wafers, the embodiments are not limited in the specimens for which they can be used. For example, the embodiments described herein may be used for specimens such as reticles, flat panels, personal computer (PC) boards, and other semiconductor specimens.

One embodiment of a system configured for detecting defects on a specimen is shown in FIG. 1. The system includes inspection subsystem 100. In the embodiment shown in FIG. 1, the inspection subsystem is configured as a light-based inspection subsystem. However, in other embodiments described herein, the inspection subsystem is configured as an electron beam or charged particle beam based inspection subsystem.

The inspection subsystem is configured for generating output responsive to patterned features formed in an array region on a specimen. In general, the inspection subsystems described herein include at least an energy source and a detector. The energy source is configured to generate energy that is directed to a specimen. The detector is configured to detect energy from the specimen and to generate output responsive to the detected energy.

In a light-based inspection subsystem, the energy directed to the specimen includes light, and the energy detected from the specimen includes light. For example, in the embodiment of the system shown in FIG. 1, the inspection subsystem includes an illumination subsystem configured to direct light to specimen 14. The illumination subsystem includes at least one light source. For example, as shown in FIG. 1, the illumination subsystem includes light source 16. In one embodiment, the illumination subsystem is configured to direct the light to the specimen at one or more angles of incidence, which may include one or more oblique angles and/or one or more normal angles. For example, as shown in FIG. 1, light from light source 16 is directed through optical element 18 and then lens 20 to specimen 14 at an oblique angle of incidence. The oblique angle of incidence may include any suitable oblique angle of incidence, which may vary depending on, for instance, characteristics of the specimen and the defects to be detected on the specimen.

The illumination subsystem may be configured to direct the light to the specimen at different angles of incidence at different times. For example, the inspection subsystem may be configured to alter one or more characteristics of one or more elements of the illumination subsystem such that the light can be directed to the specimen at an angle of incidence that is different than that shown in FIG. 1. In one such example, the inspection subsystem may be configured to move light source 16, optical element 18, and lens 20 such that the light is directed to the specimen at a different oblique angle of incidence or a normal (or near normal) angle of incidence.

In some instances, the inspection subsystem may be configured to direct light to the specimen at more than one angle of incidence at the same time. For example, the illumination subsystem may include more than one illumination channel, one of the illumination channels may include light source 16, optical element 18, and lens 20 as shown in FIG. 1 and another of the illumination channels (not shown) may include similar elements, which may be configured differently or the same, or may include at least a light source and possibly one or more other components such as those described further herein. If such light is directed to the specimen at the same time as the other light, one or more characteristics (e.g., wavelength, polarization, etc.) of the light directed to the specimen at different angles of incidence may be different such that light resulting from illumination of the specimen at the different angles of incidence can be discriminated from each other at the detector(s).

In another instance, the illumination subsystem may include only one light source (e.g., source 16 shown in FIG. 1) and light from the light source may be separated into different optical paths (e.g., based on wavelength, polarization, etc.) by one or more optical elements (not shown) of the illumination subsystem. Light in each of the different optical paths may then be directed to the specimen. Multiple illumination channels may be configured to direct light to the specimen at the same time or at different times (e.g., when different illumination channels are used to sequentially illuminate the specimen). In another instance, the same illumination channel may be configured to direct light to the specimen with different characteristics at different times. For example in some instances, optical element 18 may be configured as a spectral filter and the properties of the spectral filter can be changed in a variety of different ways (e.g., by swapping out one spectral filter with another) such that different wavelengths of light can be directed to the specimen at different times. The illumination subsystem may have any other suitable configuration known in the art for directing the light having different or the same characteristics to the specimen at different or the same angles of incidence sequentially or simultaneously.

Light source 16 may include a broadband plasma (BBP) light source. In this manner, the light generated by the light source and directed to the specimen may include broadband light. However, the light source may include any other suitable light source such as a laser. The laser may include any suitable laser known in the art and may be configured to generate light at any suitable wavelength(s) known in the art. In addition, the laser may be configured to generate light that is monochromatic or nearly-monochromatic. In this manner, the laser may be a narrowband laser. The light source may also include a polychromatic light source that generates light at multiple discrete wavelengths or wavebands.

Light from optical element 18 may be focused onto specimen 14 by lens 20. Although lens 20 is shown in FIG. 1 as a single refractive optical element, in practice, lens 20 may include a number of refractive and/or reflective optical elements that in combination focus the light from the optical element to the specimen. The illumination subsystem shown in FIG. 1 and described herein may include any other suitable optical elements (not shown). Examples of such optical elements include, but are not limited to, polarizing component(s), spectral filter(s), spatial filter(s), reflective optical element(s), apodizer(s), beam splitter(s), aperture(s), and the like, which may include any such suitable optical elements known in the art. In addition, the system may be configured to alter one or more of the elements of the illumination subsystem based on the type of illumination to be used for inspection.

The inspection subsystem may also include a scanning subsystem configured to change the position on the specimen to which the light is directed and from which the light is detected and possibly to cause the light to be scanned over the specimen. For example, the inspection subsystem may include stage 22 on which specimen 14 is disposed during inspection. The scanning subsystem may include any suitable mechanical and/or robotic assembly (that includes stage 22) that can be configured to move the specimen such that the light can be directed to and detected from different positions on the specimen. In addition, or alternatively, the inspection subsystem may be configured such that one or more optical elements of the inspection subsystem perform some scanning of the light over the specimen such that the light can be directed to and detected from different positions on the specimen. In instances in which the light is scanned over the specimen, the light may be scanned over the specimen in any suitable fashion such as in a serpentine-like path or in a spiral path.

The inspection subsystem further includes one or more detection channels. At least one of the detection channel(s) includes a detector configured to detect light from the specimen due to illumination of the specimen by the system and to generate output responsive to the detected light. For example, the inspection subsystem shown in FIG. 1 includes two detection channels, one formed by collector 24, element 26, and detector 28 and another formed by collector 30, element 32, and detector 34. As shown in FIG. 1, the two detection channels are configured to collect and detect light at different angles of collection. In some instances, both detection channels are configured to detect scattered light, and the detection channels are configured to detect light that is scattered at different angles from the specimen. However, one or more of the detection channels may be configured to detect another type of light from the specimen (e.g., reflected light).

As further shown in FIG. 1, both detection channels are shown positioned in the plane of the paper and the illumination subsystem is also shown positioned in the plane of the paper. Therefore, in this embodiment, both detection channels are positioned in (e.g., centered in) the plane of incidence. However, one or more of the detection channels may be positioned out of the plane of incidence. For example, the detection channel formed by collector 30, element 32, and detector 34 may be configured to collect and detect light that is scattered out of the plane of incidence. Therefore, such a detection channel may be commonly referred to as a "side" channel, and such a side channel may be centered in a plane that is substantially perpendicular to the plane of incidence.

Although FIG. 1 shows an embodiment of the inspection subsystem that includes two detection channels, the inspection subsystem may include a different number of detection channels (e.g., only one detection channel or two or more detection channels). In one such instance, the detection channel formed by collector 30, element 32, and detector 34 may form one side channel as described above, and the inspection subsystem may include an additional detection channel (not shown) formed as another side channel that is positioned on the opposite side of the plane of incidence. Therefore, the inspection subsystem may include the detection channel that includes collector 24, element 26, and detector 28 and that is centered in the plane of incidence and configured to collect and detect light at scattering angle(s) that are at or close to normal to the specimen surface. This detection channel may therefore be commonly referred to as a "top" channel, and the inspection subsystem may also include two or more side channels configured as described above. As such, the inspection subsystem may include at least three channels (i.e., one top channel and two side channels), and each of the at least three channels has its own collector, each of which is configured to collect light at different scattering angles than each of the other collectors.

As described further above, each of the detection channels included in the inspection subsystem may be configured to detect scattered light. Therefore, the inspection subsystem shown in FIG. 1 may be configured for dark field (DF) inspection of specimens. However, the inspection subsystem may also or alternatively include detection channel(s) that are configured for bright field (BF) inspection of specimens. In other words, the inspection subsystem may include at least one detection channel that is configured to detect light specularly reflected from the specimen. Therefore, the inspection subsystems described herein may be configured for only DF, only BF, or both DF and BF inspection. Although each of the collectors are shown in FIG. 1 as single refractive optical elements, it is to be understood that each of the collectors may include one or more refractive optical element(s) and/or one or more reflective optical element(s).

The one or more detection channels may include any suitable detectors known in the art. For example, the detectors may include photo-multiplier tubes (PMTs), charge coupled devices (CCDs), and time delay integration (TDI) cameras. The detectors may also include non-imaging detectors or imaging detectors. If the detectors are non-imaging detectors, each of the detectors may be configured to detect certain characteristics of the scattered light such as intensity but may not be configured to detect such characteristics as a function of position within the imaging plane. As such, the output that is generated by each of the detectors included in each of the detection channels may be signals or data, but not image signals or image data. In such instances, a computer subsystem such as computer subsystem 36 that forms part of an inspection system with the inspection subsystem may be configured to generate images of the specimen from the non-imaging output of the detectors. However, in other instances, the detectors may be configured as imaging detectors that are configured to generate imaging signals or image data. Therefore, the inspection subsystem may be configured to generate images in a number of ways.

It is noted that FIG. 1 is provided herein to generally illustrate a configuration of an inspection subsystem that may be included in the system embodiments described herein. Obviously, the inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the 29xx/39xx series of tools that are commercially available from KLA Corp., Milpitas, Calif. For some such systems, the methods described herein may be provided as optional functionality of the inspection system (e.g., in addition to other functionality of the inspection system). Alternatively, the inspection system described herein may be designed "from scratch" to provide a completely new inspection system.

Computer subsystem 36 may be coupled to the detectors of the inspection subsystem in any suitable manner (e.g., via one or more transmission media, which may include "wired" and/or "wireless" transmission media) such that the computer subsystem can receive the output generated by the detectors. Computer subsystem 36 may be configured to perform a number of functions using the output of the detectors as described further herein. The computer subsystem coupled to the inspection subsystem may be further configured as described herein.

The computer subsystem coupled to the inspection subsystem (as well as other computer subsystems described herein) may also be referred to herein as computer system(s). Each of the computer subsystem(s) or system(s) described herein may take various forms, including a personal computer system, image computer, mainframe computer system, workstation, network appliance, Internet appliance, or other device. In general, the term "computer system" may be broadly defined to encompass any device having one or more processors, which executes instructions from a memory medium. The computer subsystem(s) or system(s) may also include any suitable processor known in the art such as a parallel processor. In addition, the computer subsystem(s) or system(s) may include a computer platform with high speed processing and software, either as a stand-alone or a networked tool.

If the system includes more than one computer subsystem, then the different computer subsystems may be coupled to each other such that images, data, information, instructions, etc. can be sent between the computer subsystems. For example, computer subsystem 36 may be coupled to computer system(s) 102 as shown by the dashed line in FIG. 1 by any suitable transmission media, which may include any suitable wired and/or wireless transmission media known in the art. Two or more of such computer subsystems may also be effectively coupled by a shared computer-readable storage medium (not shown).

Although the inspection subsystem is described above as being an optical or light-based inspection subsystem, in another embodiment, the inspection subsystem is configured as an electron beam based inspection subsystem. In an electron beam type inspection subsystem, the energy directed to the specimen includes electrons, and the energy detected from the specimen includes electrons. In one such embodiment shown in FIG. 1a, the inspection subsystem includes electron column 122, and the system includes computer subsystem 124 coupled to the inspection subsystem. Computer subsystem 124 may be configured as described above. In addition, such an inspection subsystem may be coupled to another one or more computer subsystems in the same manner described above and shown in FIG. 1.

Figure 1A:
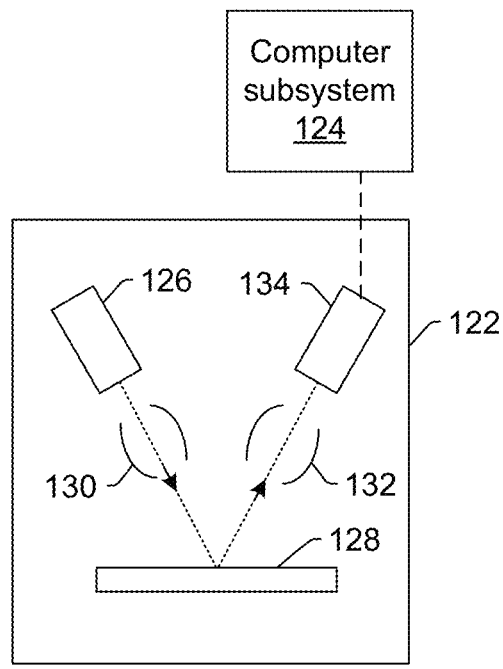

As also shown in FIG. 1a, the electron column includes electron beam source 126 configured to generate electrons that are focused to specimen 128 by one or more elements 130. The electron beam source may include, for example, a cathode source or emitter tip, and one or more elements 130 may include, for example, a gun lens, an anode, a beam limiting aperture, a gate valve, a beam current selection aperture, an objective lens, and a scanning subsystem, all of which may include any such suitable elements known in the art.

Electrons returned from the specimen (e.g., secondary electrons) may be focused by one or more elements 132 to detector 134. One or more elements 132 may include, for example, a scanning subsystem, which may be the same scanning subsystem included in element(s) 130.

The electron column may include any other suitable elements known in the art. In addition, the electron column may be further configured as described in U.S. Pat. No. 8,664,594 issued Apr. 4, 2014 to Jiang et al., U.S. Pat. No. 8,692,204 issued Apr. 8, 2014 to Kojima et al., U.S. Pat. No. 8,698,093 issued Apr. 15, 2014 to Gubbens et al., and U.S. Pat. No. 8,716,662 issued May 6, 2014 to MacDonald et al., which are incorporated by reference as if fully set forth herein.

Although the electron column is shown in FIG. 1a as being configured such that the electrons are directed to the specimen at an oblique angle of incidence and are scattered from the specimen at another oblique angle, the electron beam may be directed to and scattered from the specimen at any suitable angles. In addition, the electron beam inspection subsystem may be configured to use multiple modes to generate output for the specimen as described further herein (e.g., with different illumination angles, collection angles, etc.). The multiple modes of the electron beam inspection subsystem may be different in any output generation parameters of the inspection subsystem.

Computer subsystem 124 may be coupled to detector 134 as described above. The detector may detect electrons returned from the surface of the specimen thereby forming electron beam images of (or other output for) the specimen. The electron beam images may include any suitable electron beam images. Computer subsystem 124 may be configured to perform any step(s) described herein. A system that includes the inspection subsystem shown in FIG. 1a may be further configured as described herein.

It is noted that FIG. 1a is provided herein to generally illustrate a configuration of an electron beam inspection subsystem that may be included in the embodiments described herein. As with the optical inspection subsystem described above, the electron beam inspection subsystem configuration described herein may be altered to optimize the performance of the inspection subsystem as is normally performed when designing a commercial inspection system. In addition, the systems described herein may be implemented using an existing inspection system (e.g., by adding functionality described herein to an existing inspection system) such as the tools that are commercially available from KLA. For some such systems, the methods described herein may be provided as optional functionality of the system (e.g., in addition to other functionality of the system). Alternatively, the system described herein may be designed "from scratch" to provide a completely new system.

Although the inspection subsystem is described above as being a light or electron beam inspection subsystem, the inspection subsystem may be an ion beam inspection subsystem. Such an inspection subsystem may be configured as shown in FIG. 1a except that the electron beam source may be replaced with any suitable ion beam source known in the art. In addition, the inspection subsystem may include any other suitable ion beam system such as those included in commercially available focused ion beam (FIB) systems, helium ion microscopy (HIM) systems, and secondary ion mass spectroscopy (SIMS) systems.

The inspection subsystems described herein may be configured to generate output, e.g., images, of the specimen with multiple modes. In general, a "mode" is defined by the values of parameters of the inspection subsystem used for generating output and/or images of a specimen (or the output used to generate images of the specimen). Therefore, modes may be different in the values for at least one of the parameters of the inspection subsystem (other than position on the specimen at which the output is generated). For example, in an optical subsystem, different modes may use different wavelength(s) of light for illumination. The modes may be different in the illumination wavelength(s) as described further herein (e.g., by using different light sources, different spectral filters, etc. for different modes). In another example, different modes may use different illumination channels of the optical subsystem. For example, as noted above, the optical subsystem may include more than one illumination channel. As such, different illumination channels may be used for different modes. The modes may also or alternatively be different in one or more collection/detection parameters of the optical subsystem. The modes may be different in any one or more alterable parameters (e.g., illumination polarization(s), angle(s), wavelength(s), etc., detection polarization(s), angle(s), wavelength(s), etc.) of the inspection subsystem. The inspection subsystem may be configured to scan the specimen with the different modes in the same scan or different scans, e.g., depending on the capability of using multiple modes to scan the specimen at the same time.

In a similar manner, the output generated by the electron beam subsystem may include output, e.g., images, generated by the electron beam subsystem with two or more different values of a parameter of the electron beam subsystem. The multiple modes of the electron beam subsystem can be defined by the values of parameters of the electron beam subsystem used for generating output and/or images for a specimen. Therefore, modes may be different in the values for at least one of the electron beam parameters of the electron beam subsystem. For example, different modes may use different angles of incidence for illumination.

As noted above, the inspection subsystem is configured for scanning energy (e.g., light, electrons, etc.) over a physical version of the specimen thereby generating output for the physical version of the specimen. In this manner, the inspection subsystem may be configured as an "actual" subsystem, rather than a "virtual" subsystem. However, a storage medium (not shown) and computer subsystem(s) 102 shown in FIG. 1 may be configured as a "virtual" system. In particular, the storage medium and the computer subsystem(s) may be configured as a "virtual" inspection system as described in commonly assigned U.S. Pat. No. 8,126,255 issued on Feb. 28, 2012 to Bhaskar et al. and U.S. Pat. No. 9,222,895 issued on Dec. 29, 2015 to Duffy et al., both of which are incorporated by reference as if fully set forth herein. The embodiments described herein may be further configured as described in these patents.

Currently used CR generated reference (Ref) images cannot match Test images very well when there is relatively large color variation among the input test frames, which can be the case especially for edge die frames, thereby resulting in relatively low detection sensitivity and substantially high nuisance rates for inspection. In other words, color variation in the images may be due to some non-defect noise source on the specimen including some of those described further herein (e.g., non-defect related to thickness variation). Unless it is properly dealt with or accounted for, differences in color between images can be erroneously detected as defects, which thereby increases nuisance detection and possibly decreases the achievable inspection sensitivity. Some embodiments described herein propose a new job layout to alleviate problems caused by color variation within test frames (i.e., from test frame-to-test frame). One such embodiment of a system configured for detecting defects on a specimen includes an inspection subsystem configured for generating images for a specimen, which may include any of the inspection subsystems described herein.

The terms "image" and "image frame" are used interchangeably herein. For example, the term reference image and reference image frame are used interchangeably herein. In general, an "image frame" is defined as a collection of pixels in an image that are processed collectively for a purpose such as defect detection. The size of the image or image frame may therefore vary depending on certain characteristics of the inspection subsystem or the computer subsystem. In some inspection use cases, an image may actually be composed of multiple image frames, but that is generally not the case for the embodiments described herein. In other words, for the embodiments described herein, a reference image is the same as a reference image frame, a base image is the same as a base image frame or a non-test image frame, a test image is the same as a test image frame, and so on. However, the embodiments described herein may also be used for images that are composed of multiple frames when appropriate.

Such a system also includes a computer subsystem, which may include any of the computer subsystems described herein, configured for grouping the images generated by the inspection subsystem for a die row on the specimen into different jobs based on color so that the images in a first of the different jobs have a first color value range and the images in a second of the different jobs have a second color value range different than the first color value range. In this manner, within each die row, frames with similar color will be grouped as one job. Therefore, the embodiments described herein may be configured for a new job layout with color similarity grouping within a die row. With color similarity grouping, there is a higher chance for the generated Ref to match with Test well, leading to better defect detection sensitivity and nuisance reduction.

Figure 2:
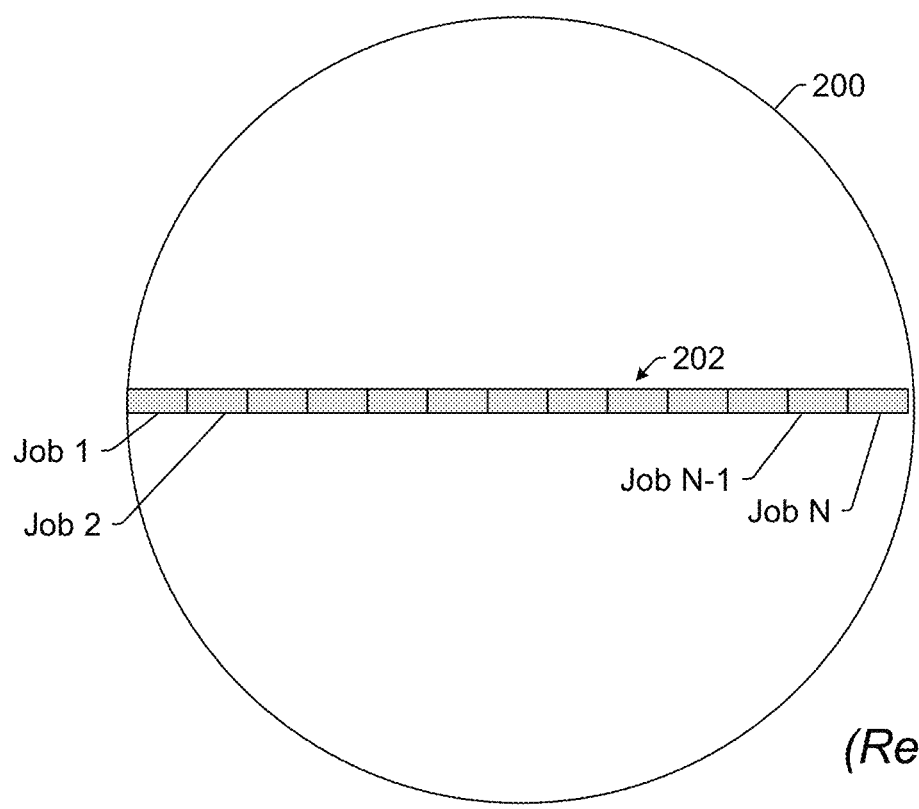
FIG. 2 is a schematic diagram illustrating a plan view of one example of a currently used job layout on a specimen.

FIG. 2 illustrates one example of a currently used CR job layout. In this example, job layout 202 is shown across a die row (not shown) on wafer 200. As shown in FIG. 2, the job layout may include Job 1, Job 2, . . . , Job N−1, and Job N. The number of jobs in the job layout may vary depending on, for example, where the job layout is on the wafer, how many frames are selected to be in each job, etc. Each of the jobs includes the same number of image frames. For example, typically, each job has about 8 frames.

A "job" as that term is used herein is defined as a number of image frames that are collectively processed by the computer subsystem for detecting defects on the specimen. Typically, the entirety of the images that are generated during an inspection process cannot be processed all together (e.g., even if it is possible, it is not typically time or cost efficient). Therefore, the entirety of the images are separated into jobs of image frames that can be processed collectively for defect detection in a more inexpensive and timely manner.

In currently used inspection recipes, the job layout is typically set up before a specimen is scanned and is not altered based on any characteristics of the images themselves. In other words, the currently used job layouts are typically static and predetermined and are not altered on the fly or based on the images generated by the inspection subsystem. In contrast, the embodiments described herein may advantageously be configured for a new job layout with similarity grouping. In particular, the computer subsystem may compare the color values of different image frames in a die row and group the image frames into jobs so that image frames having similar color are included in one job and image frames having different color are included in different jobs. In other words, the computer subsystem may group image frames having a first color value range into Job 1, image frames having a second color value range into Job 2, and so on.

Color "similarity" used by the embodiments described herein may be defined in different ways depending on the specimen, the expected variation in color, user preferences, and the like. In general, how similar the color of two image frames has to be in order to be grouped into one job may be predetermined in some manner so that color similarity grouping can be easily performed during an inspection process.

In one example, a user may set up an inspection recipe so that, in the new job layout described herein, each color value range for each job is a different single value, e.g., Job 1 includes image frames having color value 1, Job 2 includes image frames having color value 2, and so on. However, in general, having a different job for each color value may not necessarily be practical or useful. Instead, the computer subsystem may determine a color value for each image frame and the entire range of color values for all of the image frames in a die row. The entire color value range may then, in one instance, be divided into a predetermined number of sub-ranges, and the image frames may be assigned to the job associated with the sub-range in which their color values are located. For example, a user may set up a recipe to divide all of the image frames in a die row into 6 jobs, then the entire range of color values for the image frames may be divided into 6 sub-ranges, one for each job. The image frames may then be assigned to the job having a sub-range within which the color values for the images frames is included.

Other ways of defining the target number of jobs in a die row or how similar the color values of image frames need to be to be included in a single job are obviously also possible. For example, a user may specify beforehand that for any image frame, any other image frames having a color value that is within ±5% of the image frame color value are grouped together into a job. After those image frames are grouped, another image frame may be selected and grouped based on color value percentage similarity in the same way. In this manner, the grouping may continue until all image frames have been analyzed and/or grouped.

The color values used in the embodiments described herein may be gray scale values for the image frames. Since each frame may include different gray scale values (i.e., different values for different pixels in the frame), the gray scale values used for similarity grouping may be determined from some or all of the gray scale values for an image frame. For example, the color values used in the embodiments described herein may be an average gray scale value, a median gray scale value, a gray scale distribution, some property of the gray scale distribution, etc. of the pixels in the frames. In the embodiments described herein, similarity grouping may be performed based on gray scale distribution when the goal is to reduce the gray scale difference between reference and test images. However, when the goal of similarity grouping changes, the values of the image frames used for grouping may also change. For example, geometry-feature based similarity grouping may be used in the embodiments described herein to separate image frames into jobs that are separately processed for defect detection.

Unlike currently used job layouts, then, the new job layouts described herein may include jobs that have different numbers of image frames within them. In other words, not all of the jobs in the new job layout have (or need to have) the same number of image frames. For example, each input job can have a different number of frames, and the embodiments described herein support such dynamic job size cases. In one such example, as shown in the new job layout embodiment of FIG. 3, Jobs 1, 2, 3, and 4 in layout 302 all may include different numbers of image frames. Although all of the jobs in layout 302 are shown to include different numbers of image frames (as indicated by their different relative areas on the specimen), one or more of the jobs may include the same number of image frames. In other words, the embodiments described herein are less concerned with the number of image frames in each job than currently used job layouts and more concerned with the image frames in each job having color values that are similar.

Furthermore, although four jobs are shown in layout 302, the number of jobs into which the image frames in any die row swath are grouped may vary from four and may include at least two jobs without any upper limit on the number of jobs. However, the number of jobs that are generated may be somewhat limited based on a predetermined, minimum job size, which may be determined as described further herein, and the number of image frames in a die row. In general, any one image frame may be included in only one job. For example, the image frames included in one job may be mutually exclusive of the image frames included in all of the other jobs.

Figure 3:
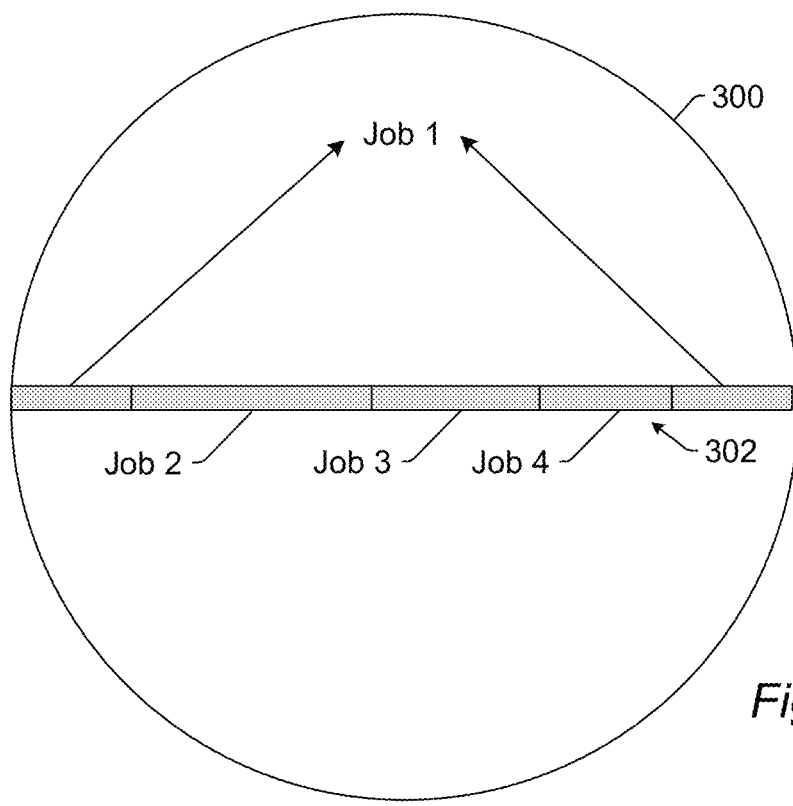
FIG. 3 is a schematic diagram illustrating a plan view of one embodiment of a job layout with similarity grouping within a die row on a specimen.

Another way that the job layout embodiments are different from currently used job layouts is that all of the image frames included in one job do not have to be located in one contiguous area on the specimen. For example, in one embodiment, at least one of the first and second of the different jobs includes two or more of the images that are generated at non-adjacent areas in the die row on the specimen. One such embodiment is shown in FIG. 3. In job layout 302 shown across a die row (not shown) on wafer 300, Job 1 includes image frames in two areas on the wafer that are spaced from each other. Jobs 2, 3, and 4 in layout 302 include images that are generated within areas that are between the areas in which the image frames included in Job 1 are generated.

In another embodiment, at least one of the first and second of the different jobs includes two or more of the images that are generated in a first area in the die row located closer to an edge of the specimen than a center of the specimen, and at least an additional one of the first and second of the different groups includes another two or more of the images generated in a second area in the die row located closer to the center of the specimen than the edge of the specimen. For example, as shown in job layout 302 in FIG. 3, Job 1 may include edge die frames (i.e., image frames generated closer to the edges of the specimen than the center of the specimen) with similar color, which resulted in those image frames being grouped into one job. In addition, the edge die frames located on both ends of the die row and spaced from each other may be grouped into one job. In contrast, Jobs 2, 3, and 4 in layout 302 are spaced from the edges of the specimen and may be located closer to the center of the specimen than the edges of the specimen.

Therefore, one advantage of the flexible job layouts described herein and grouping image frames into jobs based on color is that some image frames generated on a specimen have specimen area-specific image characteristics that are not caused by defects on the specimen. For example, some specimens like wafers can have non-defect related variations in a characteristic of a repeating patterned area on a specimen that can cause corresponding variations in images, which can then be erroneously detected as defects. However, by grouping the image frames as described herein into jobs based on an image characteristic like color, image frames having similar image characteristics will be processed collectively for defect detection. In other words, comparing (or at least using) image frames having similar image characteristics for defect detection will reduce the number of nuisances that are detected in the images and can increase the sensitivity of the inspection.

In some embodiments, the computer subsystem is configured for grouping the images into different jobs based on a predetermined, minimum job size so that each of the different jobs includes a number of the images greater than the predetermined, minimum job size. For example, instead of requiring each of the jobs to include the same number of image frames as is currently done, the embodiments described herein may only set a minimum group size for each job. Each of the jobs may then include at least that predetermined number of image frames, which can vary from job-to-job as described herein based on the similarity of the image frames and how the similarity grouping is set up.

There may be no upper limit on the number of image frames that can be included in any one job, but that may be useful, for example, when there is a practical limit on how many image frames can be processed together. For example, if the image frames in a die row are separated by color similarity into one job of edge frames and one job of center frames, the job of center frames may include so many image frames that it may be useful or practical to separate those center frames into more than one job for ease of processing. In one such example, the center frames in a die row may be so similar in color that Jobs 2, 3 and 4 shown in layout 302 of FIG. 3 may all have similar color value ranges. The computer subsystem may initially separate those image frames into a single job (not shown) separate from the image frames in Job 1 shown in layout 302. Those center image frames may then be separated again based on how many image frames are practical for any one job. Therefore, two or more of the jobs in the new layout may actually have the same or similar color value ranges.

In one such embodiment, the predetermined, minimum job size is 20 images. For example, a frame count in the new jobs may be 20 or even 30, both of which are significantly larger than the typical image frame count (8) of jobs currently used for CR type inspection. In one such example, as can be seen by comparing job layout 202 in FIG. 2 with job layout 302 in FIG. 3, job layout 202 includes many more jobs than job layout 302, and each of the jobs in job layout 302 are much larger than each of the jobs in job layout 202. With similarity grouping and larger job frame count, there is a higher chance for the generated Ref to match with Test well, leading to better defect detection sensitivity and nuisance reduction. For example, one or more of the jobs in the new job layout may be relatively small or much smaller than all or some of the other jobs. However, by setting a predetermined, minimum job size for each of the jobs that is much larger than the currently used job size, the probability of generating a reference that substantially matches a test image is much greater for each of the test images in each of the jobs than with currently used job sizes. In other words, to increase the chance that each frame inside each job has similar matching frames for the purpose of defect detection, the job size is increased. Therefore, the number of nuisances that will be detected in each test image with a reference generated from other frames in the same job as the test image will be lower and the inspection sensitivity can be higher.

The computer subsystem is also configured for detecting defects in the images in the first of the different jobs by applying a defect detection method to only the images in the first of the different jobs and detecting defects in the second of the different jobs by applying the defect detection method to only the images in the second of the different jobs. In this manner, the detecting step is performed separately for each of the different jobs. Other steps described herein such as computing reference images and generating difference images may also be performed separately for each of the different jobs. In this manner, the images in one job may be collectively processed for reference computation, difference image generation, and defect detection and separately from images in other jobs. The defects detected in each job may however be reported collectively with the defects detected in other jobs.

Defects on base frames (i.e., non-test images or images other than a test image) can introduce artifacts on Ref images. Some embodiments are configured for a new kind of double detection in order to further improve defect detection sensitivity (e.g., MCAT algorithm sensitivity) and reduce nuisance rates. For example, another advantageous embodiment is double detection performed within a die row using at least one CR. The steps performed by these embodiments may therefore be referred to as a CR double detection flow. One such embodiment of a system configured for detecting defects on a specimen includes an inspection subsystem configured for generating images for a specimen including a test image, two or more first images corresponding to the test image, and one or more second images corresponding to the test image. The inspection subsystem may be configured as described further herein. The first and second images may be any of the images in a job other than the test image in the job. Which of the base images in the job are used as the first and second images may be selected as described further herein. In other words, the terms "first" and "second" images are used herein only for ease of referring to different base images, but those terms are not meant to have any other connotation for the embodiments described herein.

Figure 4:
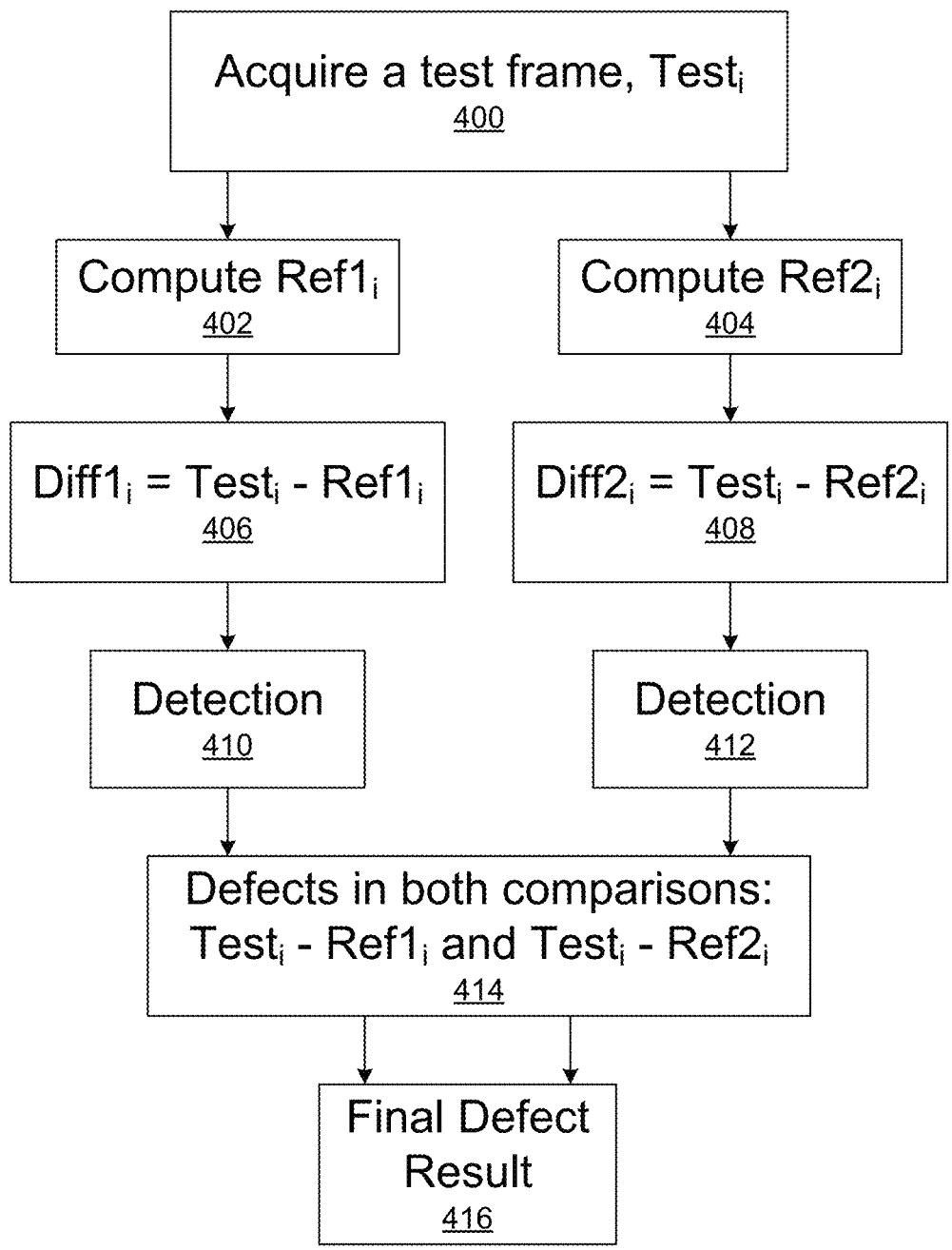
FIG. 4 is a flow chart illustrating one embodiment of steps that may be performed for detecting defects on a specimen.

One embodiment of steps that may be performed for a CR double detection flow is shown in FIG. 4. As shown in step 400, the computer subsystem may acquire a test frame, $Test_i$. Other images described above may be acquired in this step as well. The images may be responsive to patterned features formed in an area on the specimen such as a logic region. Acquiring the images may include generating the images with an inspection subsystem configured as described herein. This image acquisition may be done when the computer subsystem and the inspection subsystem are coupled in one tool and possibly when the defect detection described herein is being performed on-tool and/or as the images are being generated. In other instances, the computer subsystem may acquire the images from another method, system, or storage medium. For example, the computer subsystem and the inspection subsystem may or may not be coupled into a single tool, and the inspection subsystem, the computer subsystem, or another computer subsystem may store the images generated by the inspection subsystem. The computer subsystem may then acquire the images from the storage medium in which they are stored. This image acquisition may be done when the computer subsystem performs the steps described herein off-tool and/or after all (or at least some) of the images have been generated. Each of the elements described above may be configured as described and shown further herein.

The system also includes a computer subsystem configured for computing the first and second reference images for the test image from the two or more first images and the one or more second images, respectively. For example, as shown in steps 402 and 404 in FIG. 4, the computer subsystem may compute $Ref1_i$ and $Ref2_i$, respectively. In one embodiment, $Ref1_i$ may be computed using a current CR method, and $Ref2_i$ may be computed as a median-based CR, which is a new type of CR that may be generated as described further herein. In most instances, two reference images may be computed for each test image. In other words, the reference images may not be used for more than one test image in a job. Instead, after grouping images into jobs as described further herein, for each test frame within each job, the computer subsystem will create two reference images. Both reference images are based on the frames within the same job as the test image. The two reference images will be used to perform double detection to further suppress nuisances. In addition, the reference images will be job-specific, meaning that for each job, the computing reference image steps should be separately performed. The reference images may be computed as described further herein.

One or more characteristics of the first and second reference images are different. For example, ideally, the two reference images are not exactly the same because that would render the two comparisons between the two reference images and the test image described further herein redundant. Instead, at least one characteristic of the first reference image should be different from the same characteristic of the second reference image. Creating two useful but different reference images may be done in a couple of different ways described herein. One way is to have the two different reference images be different types of reference images, like a currently used CR and a median-based CR, which should cause the reference images to be at least somewhat different. In addition, the images that are used to generate the two different reference images may be different. For example, as described further herein, the first reference image is generated from two or more first images, and the second reference image is generated from one or more second images. In some instances, the two or more first images may be mutually exclusive of the one or more second images, meaning that none of the first images used to generate the first reference image are also used to generate the second reference image (and vice versa). However, one or more images may be used to generate both the first and second reference images. For example, in one embodiment when the second reference image is generated from a single reference image frame in a job, the first reference image may be generated from all of the image frames in the job except for the test image frame. In this manner, the image frame used to generate the second reference image may also be used to generate the first reference image. In another example, when the different reference images are different types of reference images, e.g., a currently used CR and a median-based CR, all of the image frames in a job except for the test image frame may be used to generate both reference images. In this manner, different methods may be used to generate different reference images from the same set of images.

The computer subsystem is also configured for generating first and second difference images by separately comparing the test image to the first and second reference images, respectively. For example, as shown in steps 406 and 408 of FIG. 4, the computer subsystem may generate a first difference image, $Diff1_i$, by subtracting the first reference image from the test image (i.e., $Test_i-Ref1_i$) and a second difference image, $Diff2_i$, by subtracting the second reference image from the test image (i.e., $Test_i-Ref2_i$), respectively. Subtracting the reference images from the test image may be performed in any suitable manner.

The computer subsystem is further configured for detecting defects in the test image by applying a defect detection method to the first and second difference images. For example, as shown in FIG. 4, the first difference image generated in step 406 may be input to detection step 410, and the second difference image generated in step 408 may be input to detection step 412. In perhaps the most simple implementation, detecting the defects in steps 410 and 412 may include comparing the difference image pixels or signals to a threshold and determining that any pixels or signals having a value above the threshold are defects and that any pixels or signals not having a value above the threshold are not defects. However, many more complicated defect detection methods have been developed in the art and may be used in steps 410 and 412. In other words, the difference images generated by the embodiments described herein may be used for defect detection in the same manner that any other difference images are used for defect detection. In addition, the defect detection method may include any defect detection method known in the art such as an MCAT defect detection method, which is a defect detection algorithm used by some inspection systems commercially available from KLA, or another suitable commercially available defect detection method and/or algorithm.

Figure 5:
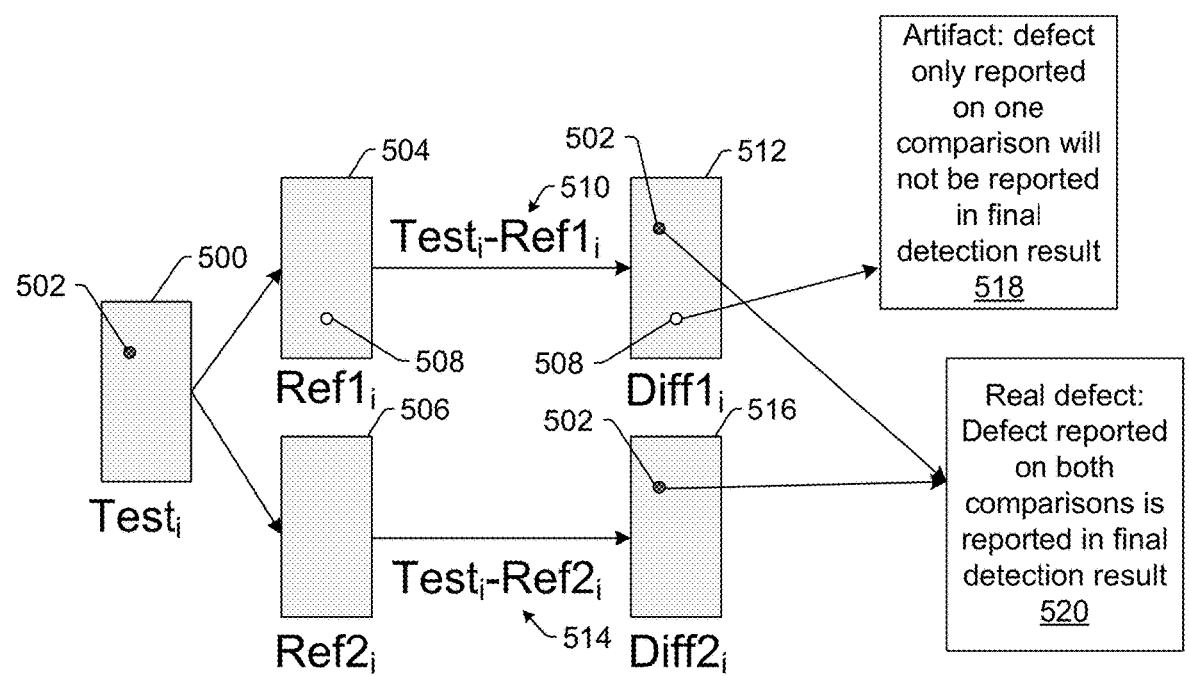
FIG. 5 is a schematic diagram illustrating an embodiment of steps that may be performed for detecting defects on a specimen.

The defect detection method determines that a defect is present at a location in the test image only when the defect detection method detects the defect at corresponding locations in the first and second difference images. For example, as shown in step 414 of FIG. 4, the defects detected by both detection steps 410 and 412 may be combined into one set of defects detected in both comparisons: $Test_i-Ref1_i$ and $Test_i-Ref2_i$. The combined set of defects may then be analyzed as shown in FIG. 5 to generate final defect result 416 shown in FIG. 4, which includes only defects detected at corresponding locations in $Diff1_i$ and $Diff2_i$. In this manner, the defect detection method is preferably configured so that a defect is only reported when a defect is detected at the same location or the same pixel in the two difference images.

FIG. 5 shows various images that may be generated or used by the embodiments described herein, but simply as single value, gray scale images except for a defect and nuisance. In this manner, the images shown in FIG. 5 are not meant to be representative of any particular kind of image that may be used or generated by the embodiments described herein. Instead they are only shown as single value, gray scale images to better illustrate the arbitration that may be performed in the CR double detection described herein.

Test image 500 includes real defect 502. Two different reference images 504 and 506 may be generated for test image 500 as described further herein. Since the two reference images have at least one different characteristic, the reference images may include different nuisances or artifacts. For example, reference image 504 includes nuisance or artifact 508 while reference image 506 does not include any nuisances or artifacts. The reference images may be used to generate different difference images for the test image. For example, difference image 512 may be generated from $Test_i-Ref1_i$ step 510, and difference image 516 may be generated from $Test_i-Ref2_i$ step 514.

Since the reference images are different, the two different difference images will also be different in important ways. For example, difference image 512 includes real defect 502 from test image 500 and nuisance or artifact 508 from reference image 504 since those are the two differences between test image 500 and reference image 504. In contrast, difference image 516 only includes real defect 502 from test image 500 because that is the only difference between test image 500 and reference image 506. A defect detection method applied to the difference images may detect real defect 502 and artifact 508 in difference image 512 as defects and real defect 502 in difference image 516 as a defect. Therefore, FIG. 5 illustrates how using only one difference image for defect detection can result in the adverse and erroneous detection of nuisances as real defects. In other words, if only reference image 504 is used for defect detection, the nuisance or artifact in this reference image may be erroneously detected as a defect.

Arbitration performed by the computer subsystem using the defects detected in both comparisons may however be used to separate real defects from artifacts. In particular, the computer subsystem may compare defects detected in the difference images and any commonalities among the defects will be designated as real defects, and any differences between the defects will be designated as artifacts. For example, because real defect 502 is detected as a defect in both difference images 512 and 516, in step 520, the computer subsystem may designate and report this detected defect as a real defect. In other words, the defect reported on both comparisons is reported in the final detection result. In contrast, because artifact 508 is detected in only one of the difference images, in step 518, the computer subsystem designates and reports this "detected defect" as an artifact. In this manner, a defect only detected by one of the comparisons will not be reported in the final detection result. The computer subsystem may compare the results of the different defect detection steps performed with different difference images in any suitable manner so that the results at corresponding locations in the different difference images can be compared to thereby determine if a detected defect is a real defect or an artifact or nuisance.

In this manner, double detection may be performed with at least one CR type reference image to further reduce nuisances and/or any artifacts. In contrast, in currently used CR, a real, relatively large defect on one or more base frames used to generate a CR can create artifacts on the final Ref created from the base frames and compared to a test frame. In the embodiments described herein with double detection, two Refs (Ref1 and Ref2) are generated for each target test frame (Test), and at least one of these Refs is a CR type Ref. A defect is reported only when it is detected in both comparisons: Test–Ref1 and Test–Ref2. So, at least one CR with double detection can remove a substantial amount of nuisances and/or any artifacts caused by the reference generation process. In other words, CR double detection can minimize the impact of unique nuisances or artifacts in reference images on defect detection results by arbitration.

This system embodiment may also be configured for grouping the images into different jobs based on color as described further herein. For example, in one embodiment, the computer subsystem is configured for grouping the images generated by the inspection subsystem for a die row on the specimen into different jobs based on color so that the images in a first of the different jobs have a first color value range and the images in a second of the different jobs have a second color value range different than the first color value range. In one such embodiment, the computing, generating, and detecting are performed separately for each of the different jobs. These embodiments may be further configured or performed as described herein.

In another embodiment, at least one of the first and second of the different jobs includes two or more of the images that are generated at non-adjacent areas in the die row on the specimen. In an additional embodiment, at least one of the first and second of the different jobs includes two or more of the images that are generated in a first area in the die row located closer to an edge of the specimen than a center of the specimen, and at least an additional one of the first and second of the different jobs includes another two or more of the images generated in a second area in the die row located closer to the center of the specimen than the edge of the specimen. These embodiments may be further configured as described herein.

In a further embodiment, the computer subsystem is configured for grouping the images into the different jobs based on a predetermined, minimum job size so that each of the different jobs includes a number of the images greater than the predetermined, minimum job size. In some embodiments, the predetermined, minimum job size is 20 images. These embodiments may be further configured as described herein.

In another embodiment, the test image is included in a job of the images generated by the inspection subsystem for the specimen and processed collectively by the computer subsystem, and the two or more of the first images and the one or more second images include other images in the job. For example, as described further herein, a "job" of images is generally defined in the art as a group of images that are processed collectively for a purpose such as defect detection. The jobs may be defined as described further herein via similarity grouping. Therefore, the first and second images that are used to detect defects in a test image may be included in the same job via the similarity grouping. In other words, all of the images used in the defect detection shown in FIGS. 4 and 5 may be in the same job. The defect detection may then be performed separately for each of the jobs, and the defects detected in each of the jobs may be combined into one defect detection result for the specimen.

In some embodiments, the two or more first images include all of the other images in the job, and the one or more second images include only one of the other images adjacent to the test image. For example, the two or more first images may be used to generate a CR type reference using either a currently used CR method or the new median-based CR method described herein. The two or more first images may in some cases include all of the image frames in a job except for the test image (although fewer than all of the base image frames may of course be used).

In this embodiment, the one or more second images may include only a single image frame adjacent to the test image. For example, the second reference image may be only an adjacent frame in the job, which may or may not be modified prior to being used as a reference image. In one such example, a single base frame adjacent to the test image may be high-pass filtered to remove relatively large image signals, but unless such processing includes combining the image frame with another image frame in some manner, such processing is generally not considered a CR method. Other image processing may also be used to modify the adjacent base frame without actually computing a reference, as that term is commonly used in the art.

In such embodiments, then, the single image frame used for the second reference image may also be used to compute the first reference image. However, the groups and numbers of image frames used to create the different reference images are different. In addition, the method used to generate or compute the different reference images are different. In this manner, the different reference images will have a high probability of not being exactly the same. In particular, it is highly unlikely that both reference images will contain the same artifacts at the same locations. In this manner, the different reference images can be successfully used for double detection as described herein for nuisance reduction and sensitivity improvement.

In a further embodiment, the two or more first images include a first subset of the other images in the job, and the one or more second images include a second subset of the other images in the job different than the first subset. The number of images included in each subset may vary greatly depending on the number of non-test images in a job and even the kind of reference images that are generated from each subset. For example, to generate a median-based CR as described herein, the minimum number of image frames required may be 3, but there is no upper limit beyond what is practical from a time and cost standpoint.

The first and second subsets may be different in a couple of important ways. One way may be as described above if the first subset includes all of the images in the job other than the test image, and the second subset includes only a single image frame adjacent to the test image frame. However, both of the subsets of images may include more than one image frame when both of the reference images are computed references. If both reference images are the same type of CR, either a currently used CR or the new median-based CR described herein, then preferably the first and second subsets of images are not exactly the same. In this manner, the different CRs will also not be exactly the same, which is advantageous as described further herein. However, when both reference images are different types of CRs, then the first and second subsets of images may or may not be different. For example, different types of CRs generated from the same images may be sufficiently different that they can be successfully used for double detection as described further herein. To ensure that the different CRs are sufficiently different, however, the images used to create each of the reference images may be different. Such image subsets may also be mutually exclusive although that is not necessary. For example, for one test image, the remaining base image frames in a job may be evenly divided (or approximately evenly divided) into different subsets of images used to separately generate different reference images.

Figure 6:
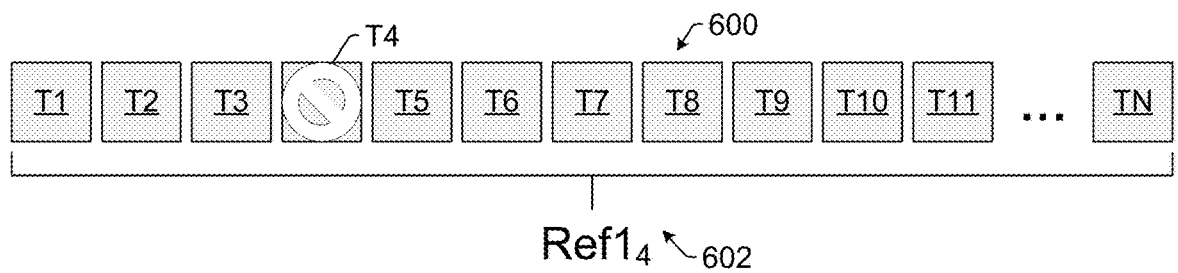
FIGS. 6-7 are schematic diagrams illustrating a plan view of images generated for a specimen by an inspection subsystem and embodiments of how the images can be used to compute a reference image.

FIG. 6 illustrates one embodiment of how a currently used type of CR may be generated for the embodiments described herein. As shown in FIG. 6, job 600 of image frames includes test images T1, T2, T3, . . . , TN. This job and the images included in it may be configured as described further herein. In this CR generation, all image frames in the job other a test frame are selected as base frames. For example, if a CR reference is being generated for test image T4, T4 will be taken out as a base image. In particular, as shown in FIG. 6, if $Ref1_4$ (602) is being generated for T4, then the images used for generating $Ref1_4$ include T1, T2, T3, T5, . . . , TN.

In one embodiment, computing the first reference image includes a minimization operation that reduces differences between the test image and the first reference image. For example, in the CR embodiments described herein, the final Ref may be the combination of all of the base frames. The combination may be optimized in such a way to minimize the differences between Test and generated Ref. In one such example, for the embodiment shown in FIG. 6 in which a CR reference image is being generated for T4, the computer subsystem may combinate other tests with minimum difference, i.e., $min \| Test_4 - Ref1_4 \|$. In this manner, the reference image may be a linear combination of the other frames within the same job. The linear combination weighting factors of each base frame may be optimized in such a way that the difference between the final reference image and the intended test image is minimal. Such optimization processing pushes the generated reference image to match with the test image as much as possible, which is how systematic noise (and low-frequency random noise) is reduced. In this manner, the minimization operation helps to reduce systematic and random noise in the difference image, Test–Ref, which is used in the detection step.

Generating a CR in this way can be used in combination with other features described herein to further reduce nuisance and increase sensitivity. For example, as described further herein, the base image selection can be extended beyond the normal job size. In one such example, the base images can come from the whole die row. With the help of similarity grouping, similar frames are grouped together to do computed reference generation. In this manner, systematic noise can be further reduced because the embodiments now have a better chance to find a better matching reference frame for each individual test frame. Such better matching then helps improve sensitivity. In other words, the embodiments described herein can optimize how a reference image is generated in two important ways. One is by changing the base image set. The other is by changing the weighting factor of each individual base image. The grouping described further herein enables changing the base image set. Changing the weighting factor is an optimization math process. Furthermore, when the base image set is large enough, more than one reference image can be generated for each test image. Then, multiple difference image values can be generated for each test image pixel. In this manner, detection can be based on these multiple difference images. One way to suppress nuisance is to report a defect only when all difference images contain a defect. This concept is basically a double detection proposal where two reference images are generated for each test image.

In an additional embodiment, the two or more first images include a first subset of images in a job of the images generated by the inspection subsystem for the specimen, the one or more second images include a second subset of the images in the job, and the first and second reference images are different types of computed reference images. In one instance, the first reference image may be a non-median CR (or a CR computed without using a median operation) and the other reference image may be a median CR computed as described further herein. The different reference images may however include other types of CRs and do not need to include a median-based CR depending on the use case. For example, if an array region is being inspected using the embodiments described herein, a median-centric reference image may not be needed as one of two reference images used for double detection. Instead, when the array pattern repeats along both the X and Y directions (which is usually the case for SRAM patterns), the embodiments can create two reference images, one from only images generated for the patterns that repeat in the X direction and another from only the images generated for the patterns that repeat in the Y direction. Those reference images can then be used for double detection in a corresponding test image. The images used to create the reference images and the types of reference images generated can really be case dependent in the embodiments described herein. A median-based CR is one advantageous way to create a second reference image, but it is obviously not the only way to create a new reference image.

As described further herein, defects on base frames can cause artifacts on Ref images. Some embodiments are configured for a new kind of reference generation method with or without double detection in order to further improve MCAT algorithm (or other types of defect detection) sensitivity and reduce nuisance rates. In one such embodiment, one of the first and second reference images is a median-based computed reference, and another of the first and second reference images is not a median-based computed reference. For example, one of the reference images may be generated by a currently used CR method or any suitable CR method known in the art, and the other reference image may be generated as a median-based CR. In this manner, a median-based CR may be used for at least one of the references in the above double detection. For example, a currently used CR method may be used to generate Ref1. Ref2 should have equally high quality as Ref1 to keep real defect signals, and Ref2 should be as unique to Ref1 as possible to remove more unique nuisances. Although it is possible that only one of the reference images may be a median-based CR, both of the references may in some cases be median-based CRs. In that case, the base images used to generate each reference image are preferably different sets of images.

In some embodiments, at least one of the first and second reference images is a median-based computed reference, and the computer subsystem is configured for computing the median-based computed reference by computing multiple-median images from different subsets of images in a job of the images generated by the inspection subsystem for the specimen and computing the median-based computed reference from the multiple-median images. For example, in median-based CR, multi-median frames may be selected as base frames to form Ref2. Each median frame is the median of a subset of test frames. The median operation helps to reduce random noise and real defect signal on base frames. Such a median-based Ref2 leads to more stable defect signals for Test–Ref2 comparisons. In addition, arbitration (double detection) removes unique nuisance and artifacts on the other Test–Ref1 comparison.

Figure 7:
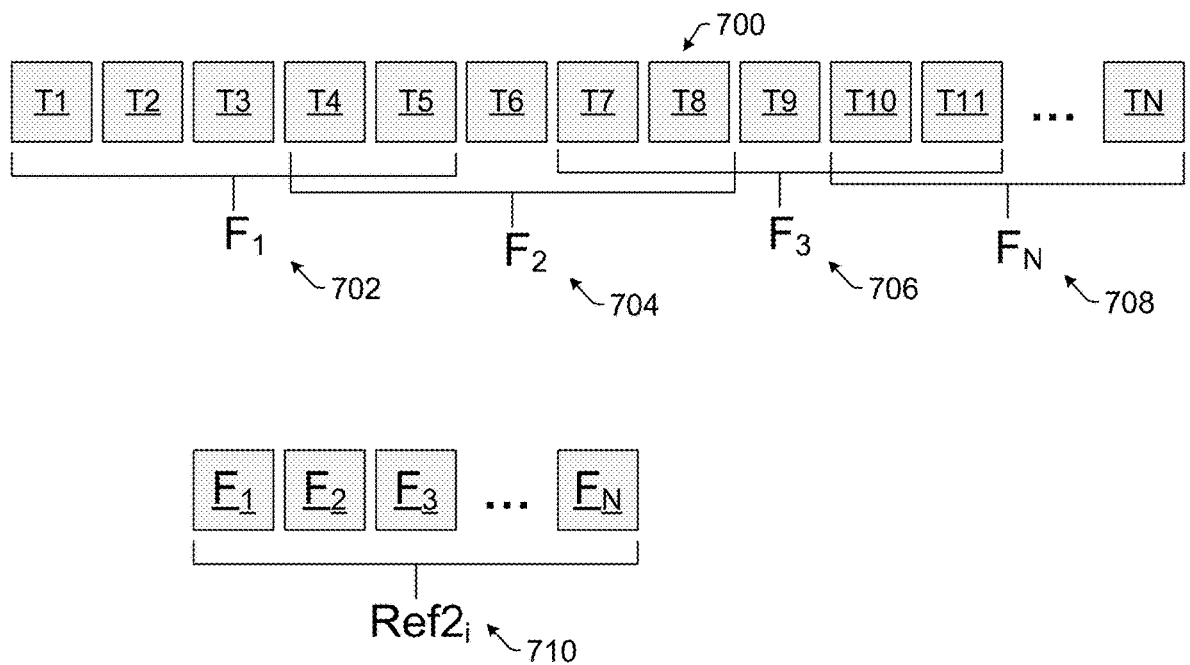

FIG. 7 shows one embodiment of how a median-based CR may be generated. In this embodiment, job 700 of input frames includes test images T1, T2, T3, . . . , TN. The job and the images included therein may be configured and generated as described further herein. A median operation may be performed by the computer subsystem to generate multiple-median images, F1 (702), F2 (704), F3 (706), . . . , FN (708). Each of the different median images may be generated from a different subset of the images in the job. For example, in FIG. 7, F1 is generated from T1 to T5, F2 is generated from T4 to T8, and so on. Although FIG. 7 shows that each median image is generated from 5 image frames, any suitable number of image frames may be used to generate each median image. In addition, although it may be easiest to use the same number of image frames to generate each median image, that is not necessary. Furthermore, although FIG. 7 shows that some of the images used to generate one of the median images may be used to also generate another of the median images (e.g., T4 is shown as being used to compute both F1 and F2), the subsets of the images used to generate each median image may be mutually exclusive of each other. The median-based CR may then be generated from the multi-median images. For example, Ref2$_i$ (710) may be generated by computing the median of F1, F2, F3, . . . , FN.

In some such embodiments, computing the median-based computed reference from the multiple-median images includes a minimization operation that reduces differences between the test image and the median-based computed reference. In one such example, for the embodiment shown in FIG. 7 in which a median-based CR reference image is being generated for T$_i$, the computer subsystem may combinate medians with minimum difference, i.e., min||Test$_i$–Ref2$_i$||. This embodiment may be further configured as described herein.

The embodiments described above do not necessarily have to be performed using a median of test images or a median or multiple median images. For example, instead of median, a local specific representative value like Image_k=F (image_k, image_k+1, image_k+2, . . . , image_k+m) where F identifies a local representative such as mean, median, or any other suitable function can be used to compute a CR as described further above. In particular, the purpose of a local median image is to provide a localized representative image. The individual image is the extreme case of a localized representative image.

CR has two main objectives: to remove low frequency noise (color noise) and to reduce high frequency at Ref image based on a linear combination of Ref candidate images. Since Ref candidates are not of orthogonal basis function, a linear combination can be practically biased to a few specific (worst case, just single) Ref candidates. Since individual images can have extreme color noise with high frequency noise, a way to keep the diversity (multiple candidates) with representative color noise as well as minimize individual high frequency noise is useful. That is why using multi-median images and computing a median is advantageous for the embodiments described herein (it is the easiest and has a relatively low computational cost.)

In the same time, the more that a scan is "hot" (i.e., using a much lower threshold than normal to catch relatively and/or substantially low signal defects), the higher chance the noise floor is touched. Touching the noise floor (i.e., detecting events (e.g., possible defects) in or near the noise floor) is very problematic as an extreme number of nuisances is caught as defects. To alleviate these problems, the new double-detection with CR is proposed for the embodiments described herein since each way of Ref generation has slightly different noise characteristics. In other words, by creating two CRs or using two reference images (one CR and one non-CR) for the embodiments described herein that have at least one different characteristic (which can be caused in a number of ways described herein) and performing double detection with those two references, the embodiments described herein can suppress more nuisances and detect more defects with higher sensitivity, even in extremely hot scans. For example, the different noise distributions in the reference images trigger different high frequency noises that can be used to remove unnecessarily high frequency nuisances by double detection that keeps only common defects between two detections.

In one embodiment, the test image, the two or more first images, and the one or more second images are generated in a logic region on the specimen. For example, the embodiments described herein may be particularly suitable for detecting defects in logic regions on a specimen. However, the embodiments are not limited in the types of regions for which they can be used. For example, as described further above, the embodiments may also be useful for defect detection in repeating memory areas, and certain steps of the embodiments can be modified depending on the use case.

Another embodiment of a system configured for detecting defects on a specimen may be configured for median-based CR with or without other features of the embodiments described herein. For example, one such system includes an inspection subsystem configured for generating images for a specimen, which may be configured as described further herein. This embodiment also includes a computer subsystem configured for computing multiple-median images from different subsets of images in a job of the images generated by the inspection subsystem for the specimen. Computing the multiple-median images may be performed as described further herein. The computer subsystem is also configured for computing a median-based computed reference from the multiple-median images, which may be performed as described further herein. In addition, the computer subsystem is configured for generating a difference image by comparing a test image in the job to the median-based computed reference. The computer subsystem is further configured for detecting defects in the test image by applying a defect detection method to the difference image. Generating the difference image and detecting the defects may be performed as described further herein. This embodiment may also be further configured according to any of the embodiments described herein.

Any of the computer subsystems described herein may generate inspection results, which may include the results of any of the steps described herein. The inspection results may include information for the detected defects such as defect IDs, location, etc., of the bounding boxes of the detected defects, sizes, detection scores, information about defect classifications such as class labels or IDs, etc., or any such suitable information known in the art. The results for the defects may be generated by the computer subsystem in any suitable manner. The results for the defects may have any suitable form or format such as a standard file type. The computer subsystem may generate the results and store the results such that the results can be used by the computer subsystem and/or another system or method to perform one or more functions for the specimen or another specimen of the same type.

The computer subsystem may be configured for storing the information for the detected defects in any suitable computer-readable storage medium. The information may be stored with any of the results described herein and may be stored in any manner known in the art. The storage medium may include any storage medium described herein or any other suitable storage medium known in the art. After the information has been stored, the information can be accessed in the storage medium and used by any of the method or system embodiments described herein, formatted for display to a user, used by another software module, method, or system, etc.

Results and information generated by performing the inspection on the specimen may be used in a variety of manners by the embodiments described herein and/or other systems and methods. Such functions include, but are not limited to, altering a process such as a fabrication process or step that was or will be performed on the inspected specimen or another specimen in a feedback or feedforward manner. For example, the computer subsystem may be configured to determine one or more changes to a process that was or will be performed on a specimen inspected as described herein based on the detected defect(s). The changes to the process may include any suitable changes to one or more parameters of the process. The computer subsystem preferably determines those changes such that the defects can be reduced or prevented on other specimens on which the revised process is performed, the defects can be corrected or eliminated on the specimen in another process performed on the specimen, the defects can be compensated for in another process performed on the specimen, etc. The computer subsystem may determine such changes in any suitable manner known in the art.

Those changes can then be sent to a semiconductor fabrication system (not shown) or a storage medium (not shown) accessible to the computer subsystem and the semiconductor fabrication system. The semiconductor fabrication system may or may not be part of the system embodiments described herein. For example, the computer subsystem and/or inspection subsystem described herein may be coupled to the semiconductor fabrication system, e.g., via one or more common elements such as a housing, a power supply, a specimen handling device or mechanism, etc. The semiconductor fabrication system may include any semiconductor fabrication system known in the art such as a lithography tool, an etch tool, a chemical-mechanical polishing (CMP) tool, a deposition tool, and the like.

The embodiments described herein have a number of advantages over other methods and systems for detecting defects on a specimen. For example, the embodiments described herein are able to provide better sensitivity due to better color variation handling via similarity grouping and the use of larger job size. The embodiments described herein are also able to further reduce nuisances and artifacts by double detection in which at least one reference image is a CR. At least one of the reference images may also be a median-based CR, which can also provide better sensitivity and reduce nuisances and artifacts than both currently used double detection methods and currently used CR methods.

The advantages described above are enabled by a number of important new features of the embodiments described herein. For example, the embodiments described herein may group frames within a die row and use a larger job size to alleviate color variation in test frame images. In addition, the embodiments described herein may be configured for CR double detection to further remove nuisances and artifacts. Furthermore, median-based CR may be used as the reference image or one of the reference images for CR double detection.

Although some of the embodiments may be described herein with respect to a "die row," the embodiments described herein may not be limited to processing images from only one die row on the specimen at a time. For example, the input to the embodiments described herein may include image frames from different die rows (not shown) on a specimen. The similarity grouping described herein with respect to grouping similar frames within one common die row can be performed in the same way to group frames from different die rows. The input frames in that instance may be the frames from the whole specimen, including frames from different die rows. Whether image frames from only one die row or multiple die rows are input to the similarity grouping may be decided based on throughput considerations. For example, grouping frames from multiple die rows requires additional operations from the hardware system side, which has a throughput impact. However, the tradeoff for the throughput impact may be better performance for inspection.

Each of the embodiments of the system described above may be combined together into one single embodiment. In other words, unless otherwise noted herein, none of the system embodiments are mutually exclusive of any other system embodiments.

Another embodiment relates to a computer-implemented method for detecting defects on a specimen. The method includes acquiring images for a specimen generated by an inspection subsystem including a test image, two or more first images corresponding to the test image, and one or more second images corresponding to the test image (as in step 400 of FIG. 4). The method also includes computing first and second reference images for the test image from the two or more first images and the one or more second images, respectively (as in steps 402 and 404 shown in FIG. 4). One or more characteristics of the first and second reference images are different. The method further includes generating first and second difference images by separately comparing the test image to the first and second reference images, respectively (as in steps 406 and 408 of FIG. 4). In addition, the method includes detecting defects in the test image by applying a defect detection method to the first and second difference images (as in steps 410 and 412 shown in FIG. 4). The defect detection method determines that a defect is present at a location in the test image only when the defect detection method detects the defect at corresponding locations in the first and second difference images (as in steps 518 and 520 in FIG. 5). The acquiring, computing, generating, and detecting steps are performed by a computer subsystem coupled to the inspection subsystem, which may be configured according to any of the embodiments described herein.

Each of the steps of the method may be performed as described further herein. The method may also include any other step(s) that can be performed by the inspection subsystem and/or computer subsystem described herein. In addition, the method described above may be performed by any of the system embodiments described herein.

Figure 8:
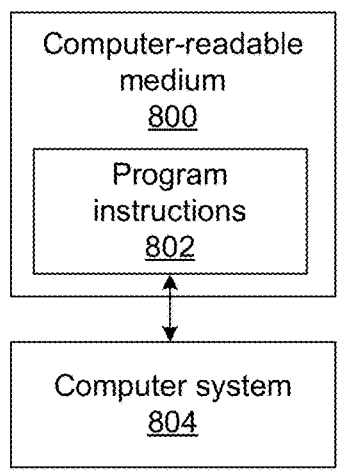
FIG. 8 is a block diagram illustrating one embodiment of a non-transitory computer-readable medium storing program instructions for causing a computer system to perform a computer-implemented method described herein.

An additional embodiment relates to a non-transitory computer-readable medium storing program instructions executable on a computer system for performing a computer-implemented method for detecting defects on a specimen. One such embodiment is shown in FIG. 8. In particular, as shown in FIG. 8, non-transitory computer-readable medium 800 includes program instructions 802 executable on computer system 804. The computer-implemented method may include any step(s) of any method(s) described herein.

Program instructions 802 implementing methods such as those described herein may be stored on computer-readable medium 800. The computer-readable medium may be a storage medium such as a magnetic or optical disk, a magnetic tape, or any other suitable non-transitory computer-readable medium known in the art.

The program instructions may be implemented in any of various ways, including procedure-based techniques, component-based techniques, and/or object-oriented techniques, among others. For example, the program instructions may be implemented using ActiveX controls, C++ objects, JavaBeans, Microsoft Foundation Classes ("MFC"), SSE (Streaming SIMD Extension) or other technologies or methodologies, as desired.

Computer system 804 may be configured according to any of the embodiments described herein.

Further modifications and alternative embodiments of various aspects of the invention will be apparent to those skilled in the art in view of this description. For example, methods and systems for detecting defects on a specimen are provided. Accordingly, this description is to be construed as illustrative only and is for the purpose of teaching those skilled in the art the general manner of carrying out the invention. It is to be understood that the forms of the invention shown and described herein are to be taken as the presently preferred embodiments. Elements and materials may be substituted for those illustrated and described herein, parts and processes may be reversed, and certain attributes of the invention may be utilized independently, all as would be apparent to one skilled in the art after having the benefit of this description of the invention. Changes may be made in the elements described herein without departing from the spirit and scope of the invention as described in the following claims.

What is claimed is:

1. A system configured for detecting defects on a specimen, comprising:
    an inspection subsystem configured for generating images for a specimen including a test image, two or more first images corresponding to the test image, and one or more second images corresponding to the test image; and
    a computer subsystem configured for:
        computing first and second reference images for the test image from the two or more first images and the one or more second images, respectively, wherein one or more characteristics of the first and second reference images are different;
        generating first and second difference images by separately comparing the test image to the first and second reference images, respectively; and
        detecting defects in the test image by applying a defect detection method to the first and second difference images, wherein the defect detection method determines that a defect is present at a location in the test image only when the defect detection method detects the defect at corresponding locations in the first and second difference images.

2. The system of claim 1, wherein computing the first reference image comprises a minimization operation that reduces differences between the test image and the first reference image.

3. The system of claim 1, wherein the test image is included in a job of the images generated by the inspection subsystem for the specimen and processed collectively by the computer subsystem, and wherein the two or more first images and the one or more second images comprise other images in the job.

4. The system of claim 3, wherein the two or more first images comprise all of the other images in the job, and wherein the one or more second images comprise only one of the other images adjacent to the test image.

5. The system of claim 3, wherein the two or more first images comprise a first subset of the other images in the job, and wherein the one or more second images comprise a second subset of the other images in the job different than the first subset.

6. The system of claim 1, wherein the computer subsystem is further configured for grouping the images generated by the inspection subsystem for a die row on the specimen into different jobs based on color so that the images in a first of the different jobs have a first color value range and the images in a second of the different jobs have a second color value range different than the first color value range.

7. The system of claim 6, wherein the computing, generating, and detecting are performed separately for each of the different jobs.

8. The system of claim 6, wherein at least one of the first and second of the different jobs comprises two or more of the images that are generated at non-adjacent areas in the die row on the specimen.

9. The system of claim 6, wherein at least one of the first and second of the different jobs comprises two or more of the images that are generated in a first area in the die row located closer to an edge of the specimen than a center of the specimen, and wherein at least an additional one of the first and second of the different jobs comprises another two or more of the images generated in a second area in the die row located closer to the center of the specimen than the edge of the specimen.

10. The system of claim 6, wherein the computer subsystem is further configured for grouping the images into the different jobs based on a predetermined, minimum job size so that each of the different jobs comprises a number of the images greater than the predetermined, minimum job size.

11. The system of claim 10, wherein the predetermined, minimum job size is 20 images.

12. The system of claim 1, wherein the two or more first images comprise a first subset of images in a job of the images generated by the inspection subsystem for the specimen, wherein the one or more second images comprise a second subset of the images in the job, and wherein the first and second reference images are different types of computed reference images.

13. The system of claim 12, wherein one of the first and second reference images is a median-based computed reference, and wherein another of the first and second reference images is not a median-based computed reference.

14. The system of claim 1, wherein at least one of the first and second reference images is a median-based computed reference, and wherein the computer subsystem is further configured for computing the median-based computed reference by computing multiple-median images from different subsets of images in a job of the images generated by the inspection subsystem for the specimen and computing the median-based computed reference from the multiple-median images.

15. The system of claim 14, wherein computing the median-based computed reference from the multiple-median images comprises a minimization operation that reduces differences between the test image and the median-based computed reference.

16. The system of claim 1, wherein the test image, the two or more first images, and the one or more second images are generated in a logic region on the specimen.

17. The system of claim 1, wherein the specimen comprises a wafer.

18. The system of claim 1, wherein the inspection subsystem is further configured as a light-based inspection subsystem.

19. The system of claim 1, wherein the inspection subsystem is further configured as an electron beam based inspection subsystem.

20. A non-transitory computer-readable medium, storing program instructions executable on a computer system for performing a computer-implemented method for detecting defects on a specimen, wherein the computer-implemented method comprises:
acquiring images for a specimen generated by an inspection subsystem including a test image, two or more first images corresponding to the test image, and one or more second images corresponding to the test image;
computing first and second reference images for the test image from the two or more first images and the one or more second images, respectively, wherein one or more characteristics of the first and second reference images are different;
generating first and second difference images by separately comparing the test image to the first and second reference images, respectively; and
detecting defects in the test image by applying a defect detection method to the first and second difference images, wherein the defect detection method determines that a defect is present at a location in the test image only when the defect detection method detects the defect at corresponding locations in the first and second difference images.

21. A computer-implemented method for detecting defects on a specimen, comprising:
acquiring images for a specimen generated by an inspection subsystem including a test image, two or more first images corresponding to the test image, and one or more second images corresponding to the test image;
computing first and second reference images for the test image from the two or more first images and the one or more second images, respectively, wherein one or more characteristics of the first and second reference images are different;
generating first and second difference images by separately comparing the test image to the first and second reference images, respectively; and
detecting defects in the test image by applying a defect detection method to the first and second difference images, wherein the defect detection method determines that a defect is present at a location in the test image only when the defect detection method detects the defect at corresponding locations in the first and second difference images, and wherein said acquiring, computing, generating, and detecting are performed by a computer subsystem coupled to the inspection subsystem.

22. A system configured for detecting defects on a specimen, comprising:
an inspection subsystem configured for generating images for a specimen; and
a computer subsystem configured for:
grouping the images generated by the inspection subsystem for a die row on the specimen into different jobs based on color so that the images in a first of the different jobs have a first color value range and the images in a second of the different jobs have a second color value range different than the first color value range;
detecting defects in the images in the first of the different jobs by applying a defect detection method to only the images in the first of the different jobs; and
detecting defects in the images in the second of the different jobs by applying the defect detection method to only the images in the second of the different jobs.

23. A system configured for detecting defects on a specimen, comprising:
an inspection subsystem configured for generating images for a specimen; and
a computer subsystem configured for:
computing multiple-median images from different subsets of images in a job of the images generated by the inspection subsystem for the specimen;
computing a median-based computed reference from the multiple-median images;
generating a difference image by comparing a test image in the job to the median-based computed reference; and
detecting defects in the test image by applying a defect detection method to the difference image.

* * * * *